No. 635,875. Patented Oct. 31, 1899.
W. C. SMITH.
BEVEL GEARING.
(Application filed May 23, 1898.)
(No Model.)
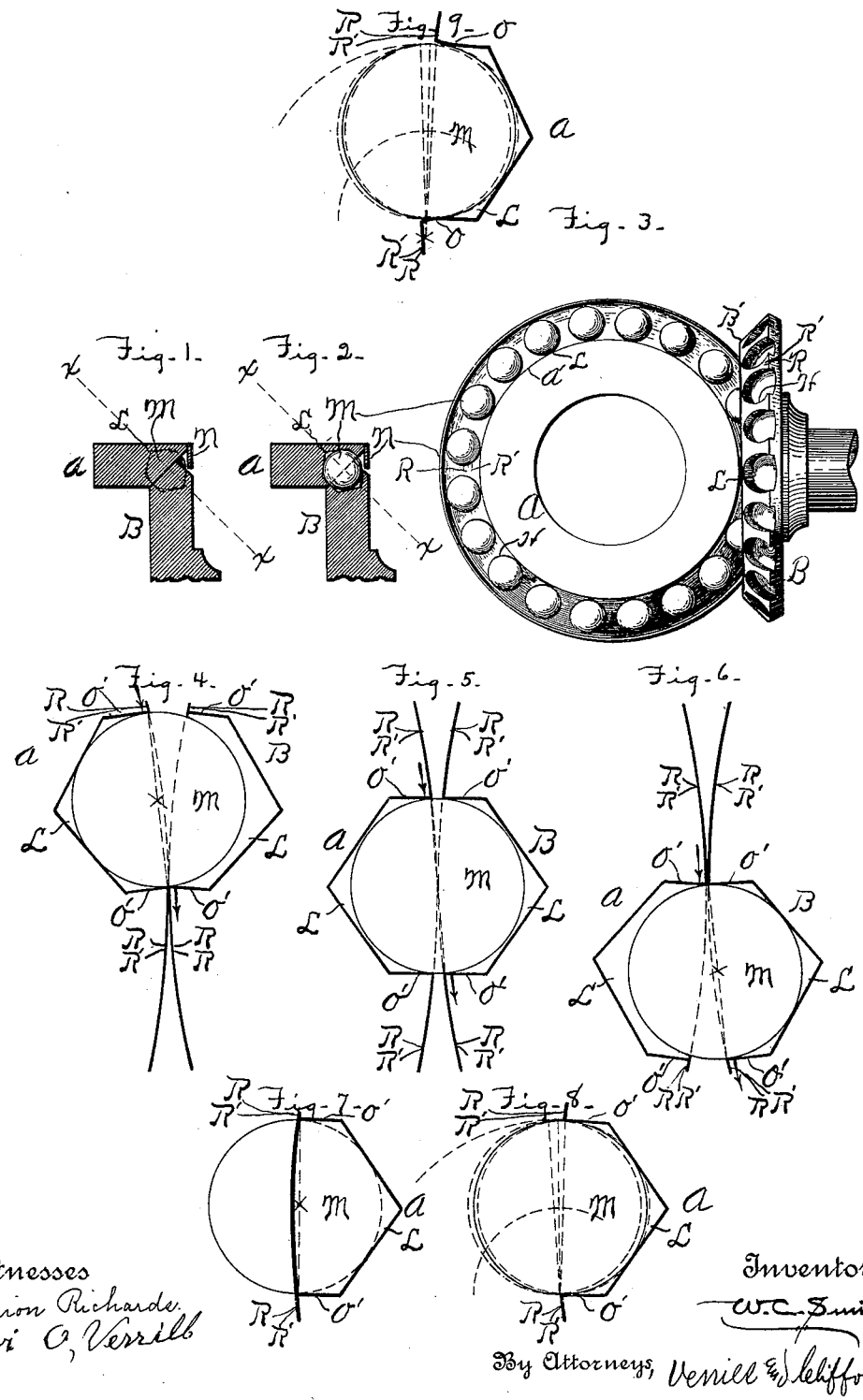

UNITED STATES PATENT OFFICE.

WILLIAM C. SMITH, OF PORTLAND, MAINE.

BEVEL-GEARING.

SPECIFICATION forming part of Letters Patent No. 635,875, dated October 31, 1899.

Application filed May 23, 1898. Serial No. 681,418. (No model.)

*To all whom it may concern:*

Be it known that I, WILLIAM C. SMITH, a citizen of the United States, residing at Portland, in the county of Cumberland and State of Maine, have invented certain new and useful Improvements in Bevel-Gearing; and I do hereby declare the following to be a full, clear, and exact description of the invention, such as will enable others skilled in the art to which it appertains to make and use the same.

My invention relates to improvements in bevel-gearing, and more particularly to an improved construction of the contacting portions thereof, whereby friction is lessened, lost motion is avoided, and consequent greater ease and steadiness of operation are secured.

In the drawings herewith accompanying and forming a part of this application, Figures 1 and 2 are horizontal sections of portions of the members of a bevel-gearing, Fig. 1 taken on a line passing between the recesses and Fig. 2 taken on a line passing through the recesses. Fig. 3 is an elevation of both members in operative position. Figs. 4, 5, and 6 are diagrammatic views showing the operation of the two members. Figs. 7 and 8 are also diagrammatic views showing, respectively, depth of recesses and movement of elements therein; and Fig. 9 is a diagrammatic view showing the movable elements traveling on a curved surface.

Same letters of reference refer to like parts in all the figures.

I am aware that it is not novel in plain gearing or a gear and sprocket to have movable connecting and operating elements confined in the recesses in one of the members and being operated on by the projections or equivalent elements of the other member; but so far as known this has been applied only to plain gears, where the motion of the movable elements of the combination is a radial motion taken with reference to the center of rotation of the gear or rotary motion in which the axis of the movable element always has a fixed position relative to the gear.

My invention consists in forming in the bevel-face of the members of a bevel-gearing recesses extending at right angles to the plane of the bevel at predetermined and regular spaces around the gear, the recesses in one member containing movable elements, said recesses being equal approximately to the semidiameter of said movable elements. I provide also means for retaining said movable elements in their recesses, but leaving said movable elements exposed to the action of the projections formed at regular and predetermined spaces on the bevel-face of the other member of the gearing.

It further consists in the peculiar conformation of the projections of the fixed members of the gearing.

In said drawings, $a$ represents one member, and B the other, of a bevel-gearing having any inclination to each other. In the bevel-face of the gear is made a series of projections R and recesses L, extending circumferentially around the gears and spaced apart to the required distance. Movable elements $m$ are mounted in said recesses. The recesses extend at right angles to the plane of the bevel-face of the gears. The movable elements may be retained in their recesses in one of said gears in any convenient manner—as, for example, by means of a flange $n$, which projects slightly over the recesses, but not sufficiently close to the movable elements to prevent them from having a slight motion in a plane at right angles to the bevel-face. The gears have their projections spaced apart, so as to engage the movable elements as the gears rotate. The contacting portions of these projections project into the space R′ between the movable elements in the opposite member and contact with said movable elements, causing them to move in their recesses slightly in a plane at right angles to the bevel.

The projections in each gear may be curved in cross-section, as seen at H, to correspond substantially with the curvature of the movable elements with which they contact when said movable elements are spherical.

The several positions which the movable elements (here shown to be spheres) take while in operating contact are illustrated in Figs. 4, 5, and 6. In Fig. 4 it has just entered contact, in Fig. 5 it has reached the central point of contact, and in Fig. 6 it is just emerging from contact. It will be seen that a line passing through the points of contact of the members $a$ and B with the movable element while in operation passes also through the center of the movable element. This obviates all tendency to force the gears apart, the force being constantly exerted in the line of a diameter of the movable element, the motion of the movable element being a tilting motion, with a constant point on the circumference of the movable element on the edge of the recess as a center, the tilting motion being further illustrated in Fig. 8. Substantially the same result is secured if the outer portion of the recess in which the movable element rests is made slightly flaring, as seen at O in Fig. 9, so that said movable element in its movement out of and into its recess may roll on a curved line, in which case instead of the movable element having a constant point of tilting contact on the outer edge O' of the wall of the recess as a center the contact-point of the movable element changes; but the movable element in this case has a rolling motion on a curved surface, so that in both cases the movable element moves in a curved line in a plane X X at right angles to the bevel-face, the two movements being illustrated in Figs 8 and 9, respectively.

The advantages of my improved gearing are less friction, and consequently greater ease of operation. It wears longer and requires less lubrication. It also renders it much less difficult to cut the projections on the bevel-gears, because they may be shaped with ordinary machine-tools, while, as is well known, the cutting of the projections on common bevel-gears requires intricate and special machinery.

Having thus described my invention and its use, I claim—

1. In a bevel-gearing, members whose peripheral faces are each provided with a series of recesses, balls and means for retaining the same in the recesses of one member, said means being spaced apart from said balls when seated in their recesses, whereby said balls may have a slight rocking movement, during contact, on the edges of the recesses in each member.

2. In a bevel-gearing, members whose peripheral faces are each provided with a series of recesses, movable elements and means for retaining each in one of said recesses, each recess in the gearing in which a movable element is retained being adapted to register with a recess in the opposite member, said last-named recess being open except when in contact with the movable element of the first-named recess and having a portion of its wall cut away to make clearance for said retaining means.

3. In a bevel-gearing, members whose peripheral faces are each provided with a series of recesses, balls and means for retaining the same in the recesses of one member, said means being spaced apart from said balls when seated in their recesses, whereby said balls may have a slight rocking movement, during contact, on the edges of the recesses in each member, said edges conforming substantially to the shape of said balls, the curvature of a large circle of the balls being at least equal to the curvature of the edges of the recesses, whereby a large bearing-surface is afforded and great strength in the wall of each recess secured.

In testimony whereof I affix my signature, in presence of two witnesses, this 21st day of May, 1898.

WILLIAM C. SMITH.

Witnesses:
ELGIN C. VERRILL,
NATHAN CLIFFORD.